(12) United States Patent
Guyot et al.

(10) Patent No.: US 7,971,241 B2
(45) Date of Patent: Jun. 28, 2011

(54) TECHNIQUES FOR PROVIDING VERIFIABLE SECURITY IN STORAGE DEVICES

(75) Inventors: Cyril Guyot, San Jose, CA (US); Jorge Campello de Souza, Cupertino, CA (US); Anand Krishnamurthi Kulkarni, San Jose, CA (US); Richard M. H. New, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 853 days.

(21) Appl. No.: 11/615,843

(22) Filed: Dec. 22, 2006

(65) Prior Publication Data

US 2008/0155680 A1 Jun. 26, 2008

(51) Int. Cl.
*G06F 7/04* (2006.01)

(52) U.S. Cl. ...... 726/17; 726/2; 726/4; 726/18; 726/26; 713/164; 713/193; 713/182; 380/28; 380/279

(58) Field of Classification Search .......... 713/164; 726/17
See application file for complete search history.

(56) References Cited

U.S. PATENT DOCUMENTS

| | | | | |
|---|---|---|---|---|
| 5,704,039 | A * | 12/1997 | Yishay et al. | 726/28 |
| 6,268,789 | B1 * | 7/2001 | Diamant et al. | 340/5.74 |
| 6,272,221 | B1 * | 8/2001 | Tsunoo | 380/28 |
| 6,738,879 | B2 * | 5/2004 | Chan et al. | 711/164 |
| 7,107,455 | B1 * | 9/2006 | Merkin | 713/182 |
| 7,111,321 | B1 * | 9/2006 | Watts et al. | 726/2 |
| 7,464,219 | B2 * | 12/2008 | Hinrichs et al. | 711/112 |
| 2002/0099950 | A1 * | 7/2002 | Smith | 713/200 |
| 2002/0184527 | A1 | 12/2002 | Chun et al. | |
| 2004/0025027 | A1 * | 2/2004 | Balard et al. | 713/183 |
| 2004/0128163 | A1 | 7/2004 | Goodman et al. | |
| 2005/0157880 | A1 * | 7/2005 | Kurn et al. | 380/279 |
| 2005/0223154 | A1 * | 10/2005 | Uemura | 711/4 |
| 2006/0123259 | A1 * | 6/2006 | Yokota et al. | 713/320 |
| 2006/0139807 | A1 * | 6/2006 | Shimotono et al. | 360/137 |
| 2007/0118768 | A1 * | 5/2007 | Wolford | 713/193 |
| 2008/0052777 | A1 * | 2/2008 | Kawano et al. | 726/18 |

FOREIGN PATENT DOCUMENTS

CN 1527208 A 9/2004

OTHER PUBLICATIONS

State Intellectual Property Office of the Peoples' Republic of China, "First Office Action Notification," for patent application 2007101936184, pp. 1-7, Jan. 8, 2010 (original and English translation).

"Software That Drives e-Commerce, Alliance AES/400," Patrick Townsend & Associates, Aug. 11, 2006, pp. 1-3.

(Continued)

*Primary Examiner* — Kambiz Zand
*Assistant Examiner* — Yonas Bayou
(74) *Attorney, Agent, or Firm* — Steven J. Cahill

(57) ABSTRACT

A verifiable security mode is provided for securing data on a storage device, such as a hard disk drive. When the verifiable security mode is enabled, only authenticated accesses to data stored on the storage device are permitted after entering a password. An end user is prevented from disabling the verifiable security mode. The verifiable security mode can be set to allow or disallow an administrator from disabling the verifiable security mode. The verifiable security mode can be implemented, for example, in firmware on a hard disk drive (HDD).

20 Claims, 3 Drawing Sheets

OTHER PUBLICATIONS

Barrie VanBrackle and Paul Masto, "Identity Theft: Federal Law Enforcement & Legal Updates," ETA Annual Meeting and Expo 2006, Apr. 19, 2006, pp. 1-15.

Harald Bogeholz, "At Your Disservice: How ATA security functions jeopardize your data," Aug. 2005, pp. 1-7, http://www.heise.de/ct/english/05/08/172/.

* cited by examiner

TECHNIQUES FOR PROVIDING VERIFIABLE SECURITY IN STORAGE DEVICES

BACKGROUND OF THE INVENTION

The present invention relates to storage devices, and more particularly, to techniques for providing security for the contents of storage devices, such as hard disk drives.

The enactment of strong privacy legislation at the state and federal level in recent years has put pressure on businesses to secure their data. Because of this legislation, it has become increasingly important for companies to prove that data is secure.

AT Attachment (ATA) is a standard interface for connecting storage devices such as hard disks and CD-ROM drives inside personal computers. The ATA specifications contain a security locking mechanism that protects data stored on a storage device, such as a hard disk drive. The security locking mechanism provides two passwords, a user password and a master password. The passwords are used to provide access control to the data on the storage device.

Access control is enabled by setting the user password with the Security Set Password command. Once access control has been enabled, a hard disk drive (HDD) automatically comes up into a locked state whenever it is powered on. In this locked state, the hard disk drive does not allow access to its data and accepts only a limited number of commands, such as Identify Device. The Security Unlock command with the user password unlocks the HDD temporarily until its next power cycle. When the computer is cold booted, the hard disk drive locks the data again. The access control feature can be permanently disabled by entering the user password and a Security Disable command, which can only be issued when the HDD is in an unlocked state. Once the access control feature has been disabled, a user can access the data on the HDD after reboot without entering a password.

The function of the master password is determined by a security level setting ("high" or "maximum"), which is specified when either of the passwords (master or user) is set. When the security level is set to "high", the master password can unlock the data in the event that the user password is lost. When the "maximum" security level is selected, only the user password provides access to the data. The maximum security level disables the use of the master password for accessing the data or turning off the security locking mechanism.

In the maximum security level, the administrator can only unlock the data with the master password after performing a Secure Erase of the disk. The Secure Erase command erases all of the data on the disk and disables the access control mechanism. The Secure Erase command can be issued either when the HDD is in an unlocked state, or after authentication with the master password when the HDD is in a "high" level of security.

The ATA security locking mechanism ensures that data is inaccessible as long as the security locking mechanism has not been turned off. However, because the Security Disable command can be activated with the User password, a business runs the risk that an employee may turn off the security locking mechanism before the data is lost or stolen.

Therefore, it would be desirable to provide more secure techniques for controlling access to data on storage devices.

BRIEF SUMMARY OF THE INVENTION

The present invention provides a verifiable security mode for securing data on a storage device, such as a hard disk drive. When the verifiable security mode is enabled, only authenticated accesses to data stored on the storage device are permitted after entering a password. An end user is prevented from disabling the verifiable security mode. The verifiable security mode can be set to allow or disallow an administrator from disabling the verifiable security mode. The verifiable security mode can be implemented, for example, in firmware on a hard disk drive (HDD).

Other objects, features, and advantages of the present invention will become apparent upon consideration of the following detailed description and the accompanying figures.

DETAILED DESCRIPTION OF THE INVENTION

The ATA security features described above provide some degree of data security. However, because the ATA security features are maintained in the basic input/output system (BIOS) of a computer, ATA passwords can be circumvented relatively easily, by actively swapping electronics cards, or with a brute force media scan. A typical mode of attack is to transfer the HDD to another machine, so as to bypass the operating system access control.

Data on a hard disk can be bulk encrypted to prevent these types of attacks. Bulk encryption can be used to enhance the level of data security protection provided by the ATA BIOS security locking mechanism. Alternatively, bulk encryption can be linked with some other access control scheme (other than ATA BIOS passwords). Bulk encrypting data prevents HDDs with customer data from being disclosed to unauthorized individuals.

For example, bulk encryption prevents unauthorized users from accessing data on an encrypted hard disk by using a brute force media scan or actively swapping electronics cards to bypass ATA security features that are controlled by the BIOS. Bulk encryption can also be used to enable a fast secure erase of data on a HDD, or to simplify the redeployment and decommissioning of used systems. In addition, bulk encryption can provide protection against reporting obligations when customer data is lost or stolen.

Figure 1:
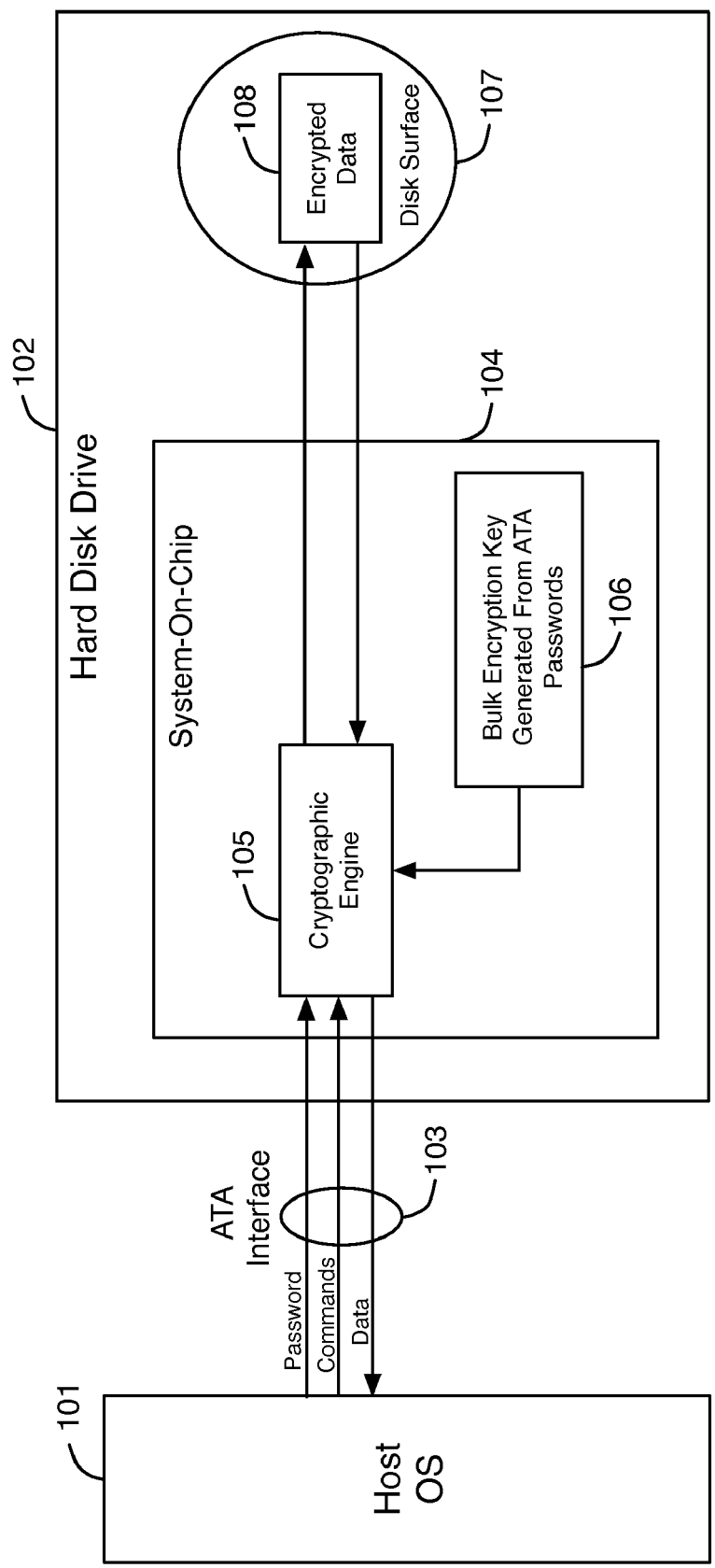
FIG. 1 illustrates an example of a hard disk drive that bulk encrypts data stored on a hard disk, according an embodiment of the present invention.

FIG. 1 illustrates an example of a hard disk drive 102 that bulk encrypts data stored on a hard disk, according to an embodiment of the present invention. Host operating system (OS) 101 communicates with hard disk drive 102 through an ATA interface 103. The ATA interface 103 is typically managed by software stored in the BIOS. ATA interface 103 controls access to the data stored in hard disk drive 102 using the security locking mechanism described above. Host OS 101 sends a password to hard disk drive 102 through ATA interface 103 to unlock the data stored in drive 102. Once the data is unlocked, host OS 101 sends read/write commands and data to hard disk drive 102 through ATA interface 103, and hard disk drive 102 returns data to host OS 101 through ATA interface 103 in response to the read commands.

Hard disk drive (HDD) 102 contains a system-on-chip (SOC) 104 that includes a cryptographic engine 105. Cryptographic engine 105 can be implemented in hardware, in software, or in both hardware and software. SOC 104 generates a bulk encryption key 106 from the ATA passwords. Cryptographic engine 105 encrypts data stored on disk surface 107 of a hard disk using the bulk encryption key 106. As a result, all of the data 108 stored on disk surface 107 is encrypted. Encrypted data 108 can only be accessed with the encryption key.

The basic input/output system (BIOS) in a client machine monitors and manages all ATA security commands issued to the hard disk drive (HDD). According to an embodiment of the present invention, security features in the BIOS can prevent an end user from either disabling the access control or performing a secure erase of the data on the disk without entering the master password. To enforce these constraints, the BIOS preferably always performs a Freeze Lock on the main HDD of interest in the system, regardless of where the system boots from. However, a determined end user can, in principle, circumvent any BIOS restrictions by removing the HDD from the system and installing it on another machine.

In addition to the BIOS based ATA security locking mechanism, additional security features can be implemented by firmware in the hard disk drive (HDD), according to another embodiment of the present invention. When the additional security features are enabled, the HDD is placed into a verifiable security mode that cannot be disabled. The additional security features place the HDD into a provably secure state.

For example, a hard disk drive can disable the Security Disable Password command to provide an additional security feature. When the Security Disable Password command is disabled, the hard disk drive prevents a user from disabling the user password. This additional security feature prevents a user from disabling the ATA security feature that requires the entry of a user password each time the computer is rebooted or reset. Thus, the user cannot get the HDD out of a secure state.

When the Security Disable Password command is disabled, firmware in the hard disk drive controller does not accept data accesses from the host OS after reboot or reset without a user password. If the user password is not entered, the HDD enters a locked state in which data access to the HDD are blocked. Alternatively, the hard disk drive can prevent an administrator from disabling the master password.

Even when the Security Disable Password command is disabled, a user is still allowed to change the user password after entering the current user password. The hard disk drive can impose further constraints by requiring that the user and/or master password have a minimum number of characters and/or a minimum number of specific types of characters.

As another example, the hard disk drive can be placed into a security mode that requires the entry of the master password to perform the Security Erase Unit command. In this security mode, the hard disk drive prevents a user from using the Security Erase Unit command to erase all of the data on the hard disk by entering the user password. The hard disk drive only erases all of the data on the hard disk when the Security Erase Unit command is entered in conjunction with the master password. Thus, only an administrator with access to the master password is allowed to wipe out all of the stored data.

As yet another example, the hard disk drive can be placed into a verifiable security mode that prevents a user from changing the master password using the Security Set Password command. In this enhanced security mode, the hard disk drive refuses to accept the user password to generate a new master password or to disable the master password.

Figure 2:
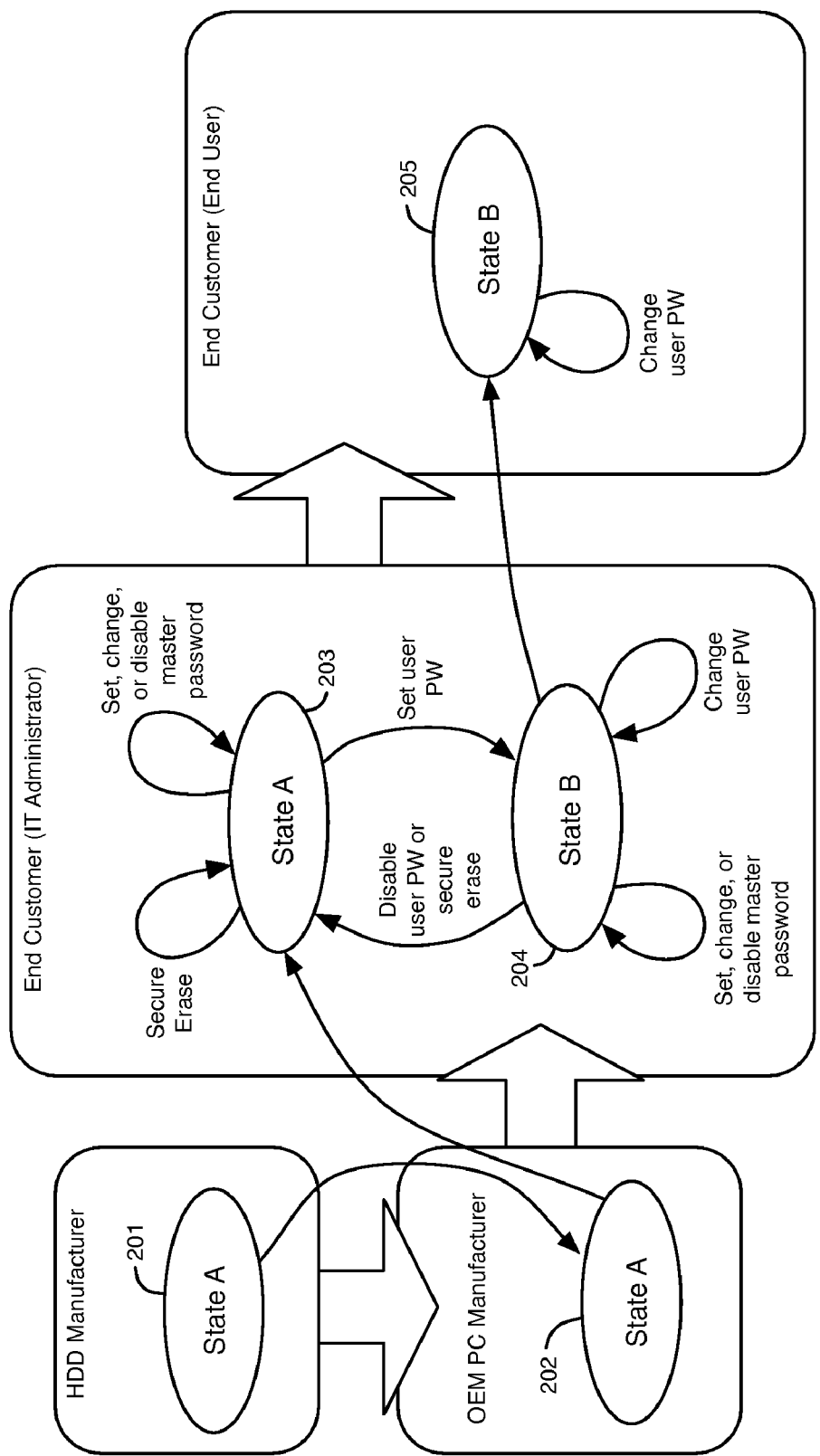
FIG. 2 illustrates a state diagram that depicts a deployment process for a hard disk drive that be placed in a verifiably secure mode, according to an embodiment of the present invention.

FIG. 2 illustrates a state diagram that depicts a deployment process for a hard disk drive (HDD) that can be placed in a verifiably secure mode, according to an embodiment of the present invention. The specific details shown in and described with respect to FIG. 2 are illustrative examples that are not intended to limit the scope of the present invention.

A hard disk drive (HDD) configured to implement a verifiable security mode of the present invention provides a provable technique for securing the data stored on the HDD. In state 201, the HDD manufacturer turns the security features of the HDD off and enables bulk encryption. The HDD is then shipped to a PC original equipment manufacturer (OEM).

The PC OEM keeps the security features off and bulk encryption enabled in state 202 when it installs the HDD into a computer. The computer is then shipped to an end customer and provided to an information technology (IT) administrator. When the computer is initially received by the end customer, the HDD is in state 203. The HDD bulk encrypts all of the data that is stored on the hard disk(s) in state 203.

In state 203, the IT administrator can set, change, or disable the master password (PW). Also, the IT administrator can perform a secure erase of all of the data on the hard disk in state 203 by entering the master password. During a secure erase of the hard disk, all of the data is lost, and the HDD generates a new encryption key that is used to encrypt data stored on the disk after the secure erase.

The IT administrator can place the HDD in a verifiably secure mode (state 204) by setting the user password (PW). In state 204, the IT administrator can change the user password. The IT administrator can also set, change, or disable the master password in state 204. In state 204, the HDD continues to bulk encrypt data stored on the hard disk(s). The IT administrator can return to state 203 to disable the user password after he has entered the master password. The IT administrator can also return to state 203 by entering the Secure Erase Unit command in conjunction with the master password to securely erase all data on the hard disk(s).

In state 204, the HDD disables the Security Disable Password command. When the Security Disable Password command is disabled, the HDD prevents an end user from disabling the user password. Also in state 204, the HDD prevents a user from using the Security Erase Unit command to erase the disk with the user password. A secure erase of the data on the disk can only be performed by entering the master password. Thus, if the end user does not have the master password, the HDD prevents the user from disabling the user password or securely erasing the disk. Also, in state 204, the HDD prevents a user from setting, changing, or disabling the master password by entering the user password with the Security Set Password command.

After the HDD has been placed in state 204, the computer containing the HDD can be given to an end user (e.g., an employee of the end customer). The HDD is now in state 205. In state 205, the end user can change the user password after entering the current user password. Changing the user password is the only change to the security functions that the HDD allows the end user to perform in state 205.

State 205 is essentially the same state as state 204, except that the end user does not have access to the master password. When the HDD is in state 205, the end user cannot disable the user password or perform a secure erase of the data on the disk by entering the user password. The end user also cannot set, change, or disable the master password in state 205. Because the end user is only allowed to change the user password, the end customer can ensure that the data stored on the hard disk drive is encrypted and protected by the user password, even if the computer gets stolen.

In FIG. 2, state A corresponds to states 201-203, and state B corresponds to states 204 and 205. The HDD is in a verifiably secure mode in state B. In the verifiably secure mode, the end customer can prove that the data on the HDD is encrypted and protected by a password that cannot be disabled by the end user. After the HDD is placed in state B 204, the computer can generate a certificate as documentation that the HDD has been placed into a verifiably secure mode.

According to a further embodiment of the present invention, a vendor unique bit in the device configuration overlay (DCO) feature is set to disable the Security Disable Password command, the Security Erase Unit command, and the Security Set Password command, to implement the security features described above. These three commands can also be replaced with vendor specific versions having desired properties. DCO commands cannot be issued when the HDD security feature set is enabled, so the HDD remains in a secure constrained state until a Security Erase Unit command is issued with the master password. The end customer IT Administrator needs to create and enforce policies to ensure that all systems deployed within a company are placed into a constrained state, with the HDD security features enabled.

According to yet another embodiment, a hard disk drive of the present invention can irreversibly lock up in a verifiably secure mode if the user password and the master password are both lost. Once the hard disk drive has entered the irreversibly locked state, none of the data on the hard disk drive can be accessed, and the hard disk drive cannot be securely erased. The hard disk drive becomes completely unusable in the irreversibly locked state.

According to yet another embodiment, a hard disk drive of the present invention can be placed in a verifiable security mode in which an administrator cannot disable the master password after the master password has been set. In this type of mode, the hard disk drive permanently maintains itself in a mode that requires the entry of the master password (or the user password) after reboot or reset, once the master password has been set. An administrator can only change the master password after it has been set.

Figure 3:
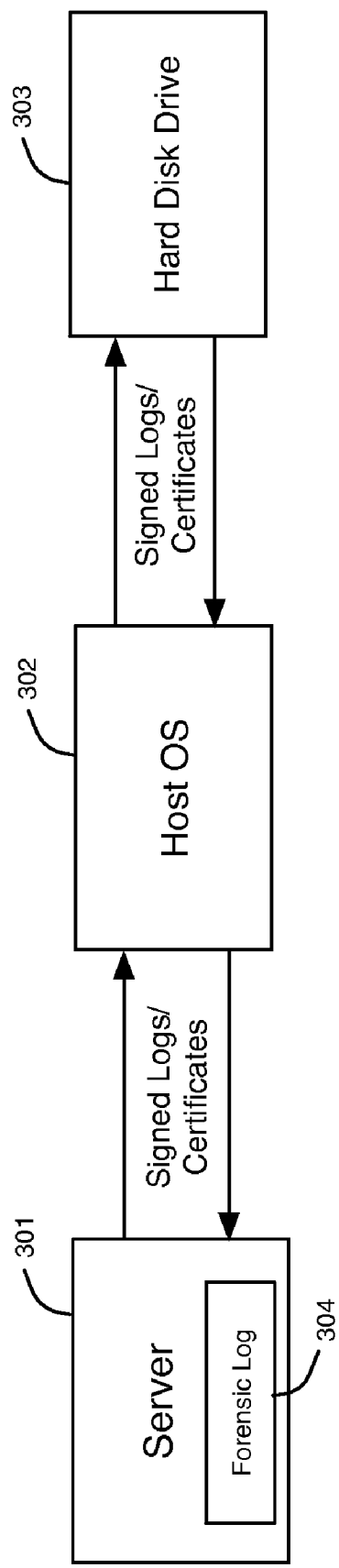
FIG. 3 illustrates a system for checking whether a hard disk drive is functioning in a verifiably secure mode, according to another embodiment of the present invention.

FIG. 3 illustrates a system for checking whether a HDD is functioning in a verifiable security mode, according to another embodiment of the present invention. According to this embodiment, a hard disk drive (HDD) 303 periodically generates signed logs or signed certificates that indicate what security and access control features are presently enabled on HDD 303. The signed certificates can be generated and unlocked using well-known public and private encryption keys.

A host operating system (OS) 302 receives the signed logs or signed certificates from hard disk drive (HDD) 303 and periodically transmits the signed logs/certificates to a server 301 that is connected to host OS 302 through a network. Server 301 determines whether HDD 303 is functioning in the correct security compliant mode based on which security and access control features are enabled. Server 301 also authenticates the signed logs/certificates to ensure that they were transmitted from the correct HDD 303.

For example, server 301 can check to ensure that the appropriate security features are set on HDD 303 so that the user cannot perform a secure erase of the disk or disable the user or the master passwords. If the HDD is not in the correct security compliant mode, the server instructs the host operating system to disable communications with the HDD until the HDD can be placed in the correct mode.

HDD 303 issues signed logs or certificates when certain security and access control features are enabled or disabled. The host OS 302 transmits the signed logs/certificates to server 301. Server 301 stores the signed logs/certificates in a forensic log 304.

According to another embodiment, only a signed request from the server 301 to the HDD 303 can cause the HDD 303 to change its access control state. The HDD 303 authenticates a signed certificate from server 301 requesting the HDD to change its access control state to ensure that the request is sent from an authorized source. Typically, server 301 sends a signed certificate to the HDD 303 in order to authenticate the server to the HDD, whereas HDD 303 sends a signed log to server 301 to authenticate the origin of the log.

The foregoing description of the exemplary embodiments of the present invention has been presented for the purposes of illustration and description. It is not intended to be exhaustive or to limit the present invention to the precise form disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is intended that the scope of the present invention be limited not with this detailed description, but rather by the claims appended hereto.

The invention claimed is:

1. A hard disk drive that comprises code for providing data security, wherein the code is stored on a computer readable medium, the hard disk drive comprising:
   code for generating in the hard disk drive a bulk encryption key from a plurality of advanced technology attachment (ATA) passwords;
   code for bulk encrypting data stored on a hard disk in the hard disk drive using the bulk encryption key;
   code for placing the hard disk drive into a security mode that only permits authenticated accesses to the data stored on the hard disk;
   code for preventing an end user of the hard disk drive from disabling the security mode; and
   code for receiving a signed request from a server via a host operating system, wherein only the signed request from the server enables the hard disk drive to change an access control state of the hard disk drive.

2. The hard disk drive defined in claim 1 further comprising:
   code for allowing an administrator to disable the security mode.

3. The hard disk drive defined in claim 1 wherein the code for preventing the end user from disabling the security mode further comprises code for preventing the end user from disabling code that requires entry of a user password to access the data.

4. The hard disk drive defined in claim 2 wherein the code for allowing the administrator to disable the security mode further comprises code for requiring the administrator to enter a master password to disable the security mode, and wherein the code for preventing the end user from disabling the security mode further comprises code for preventing the end user from setting, changing, or disabling the master password.

5. The hard disk drive defined in claim 1 wherein the code for preventing the end user from disabling the security mode further comprises code for preventing the end user from using a security erase unit command to erase all data on the hard disk by entering a user password.

6. The hard disk drive defined in claim 1 wherein the code for preventing the end user from disabling the security mode further comprises code for allowing the end user to change a user password.

7. The hard disk drive defined in claim 1 further comprising a system-on-chip (SOC) that includes a cryptographic engine, wherein the cryptographic engine generates the bulk encryption key from the plurality of ATA passwords.

8. The hard disk drive defined in claim 1 further comprising:
    code for periodically generating at least one of a signed certificate and a signed log that indicates whether the hard disk drive is currently in the security mode; and
    code for transmitting the at least one of the signed certificate and the signed log to the host operating system.

9. The hard disk drive defined in claim 8, wherein the server stores the at least one of the signed certificate and the signed log in a forensic log.

10. The hard disk drive defined in claim 1 wherein the code for placing the hard disk drive into the security mode that only allows authenticated accesses to the data stored on the hard disk further comprises code for requiring entry of a password to access the data after a reboot.

11. A method for providing verifiable data security on a hard disk drive, method comprising:
    generating in the hard disk drive a bulk encryption key from a plurality of advanced technology attachment (ATA) passwords;
    bulk encrypting data stored on a hard disk in the hard disk drive using the bulk encryption key;
    placing the hard disk drive into a verifiable security mode that only permits authenticated accesses to the data stored on the hard disk by entering a password;
    preventing an end user of the hard disk drive from disabling the verifiable security mode; and
    receiving a signed request from a server via a host operating system, wherein only the signed request from the server enables the hard disk drive to change an access control state of the hard disk drive.

12. The method defined in claim 11 further comprising:
    allowing an administrator to disable the verifiable security mode.

13. The method defined in claim 11 further comprising:
    preventing an administrator from disabling the verifiable security mode after the hard disk drive has been set into the verifiable security mode.

14. The method defined in claim 11 wherein preventing the end user of the hard disk drive from disabling the verifiable security mode further comprises preventing the end user from disabling the hard disk drive from requiring entry of a user password to access the data on the hard disk.

15. The method defined in claim 12 wherein allowing the administrator to disable the verifiable security mode further comprises requiring the administrator to enter a master password to disable the verifiable security mode, and wherein preventing the end user of the hard disk drive from disabling the verifiable security mode further comprises preventing the end user from setting, changing, or disabling the master password.

16. The method defined in claim 11 wherein preventing the end user of the hard disk drive from disabling the verifiable security mode further comprises preventing the end user from securely erasing all data on the hard disk by entering a user password and a security erase unit command.

17. The method defined in claim 11 wherein the hard disk drive comprises a system-on-chip (SOC) that comprises a cryptographic engine, and wherein the cryptographic engine generates the bulk encryption key from the plurality of ATA passwords.

18. The method defined in claim 11 further comprising:
    periodically generating signed certificates that indicate whether the hard disk drive is currently in the verifiable security mode; and
    transmitting the signed certificates to the server.

19. A hard disk drive that comprises code for providing data security, wherein the code is stored on a computer readable medium, the hard disk drive comprising:
    code for generating in the hard disk drive a bulk encryption key from a plurality of advanced technology attachment (ATA) passwords;
    code for bulk encrypting data stored on a hard disk in the hard disk drive using the bulk encryption key;
    code for placing the hard disk drive into a security mode that only permits authenticated accesses to the data stored on the hard disk by entering a password;
    code for allowing an administrator to disable the security mode by entering a master password;
    code for preventing an end user of the hard disk drive from disabling the security mode by entering a user password; and
    code for receiving a signed request from a server via a host operating system, wherein only the signed request from the server enables the hard disk drive to change an access control state of the hard disk drive.

20. The hard disk drive defined in claim 19 wherein the code for preventing the end user from disabling the security mode further comprises code for preventing the end user from setting, changing, or disabling the master password.

* * * * *